(12) United States Patent
Brenden et al.

(10) Patent No.: US 9,431,050 B1
(45) Date of Patent: Aug. 30, 2016

(54) PREAMPLIFIER COMMON-MODE NOISE REJECTION FOR TWO-DIMENSIONAL MAGNETIC RECORDING

(71) Applicant: Avago Technologies General IP (Singapore) Pte. Ltd., Singapore (SG)

(72) Inventors: Jason P. Brenden, Woodbury, MN (US); David Fitzgerald, Inver Grove Heights, MN (US); Jeffrey A. Gleason, Mendota Heights, MN (US); Scott M. O'Brien, Mendota Heights, MN (US); Michael Straub, Mendota Heights, MN (US); Ross S. Wilson, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/928,399

(22) Filed: Oct. 30, 2015

(51) Int. Cl.
  *G11B 5/09* (2006.01)
  *G11B 5/02* (2006.01)
  *G11B 20/10* (2006.01)
  *G11B 5/012* (2006.01)

(52) U.S. Cl.
  CPC ......... *G11B 20/10009* (2013.01); *G11B 5/012* (2013.01); *G11B 5/09* (2013.01)

(58) Field of Classification Search
  None
  See application file for complete search history.

(56) References Cited

U.S. PATENT DOCUMENTS

| | | | | |
|---|---|---|---|---|
| 6,538,832 | B1* | 3/2003 | Ranmuthu | G11B 5/012 360/46 |
| 7,006,313 | B2* | 2/2006 | Ngo | G11B 5/012 360/46 |
| 8,982,489 | B1 | 3/2015 | Voo et al. | |
| 8,988,803 | B1 | 3/2015 | Wilson et al. | |
| 9,099,156 | B2 | 8/2015 | Miao et al. | |
| 9,147,419 | B2* | 9/2015 | Oberg | G11B 5/5965 |

* cited by examiner

*Primary Examiner* — K. Wong

(57) ABSTRACT

An apparatus for two-dimensional magnetic recording includes an array reader with a number of magnetoresistive read sensors configured to read data from a storage medium. The magnetoresistive read sensors have a number of connection terminals, with at least one of the connection terminals being shared by more than one of the magnetoresistive read sensors. The apparatus also includes a number of low-noise amplifiers connected to the connection terminals, each configured to amplify a differential signal from a different one of the magnetoresistive read sensors. The apparatus also includes a number of impedance balancing networks connected to a subset of the connection terminals.

20 Claims, 6 Drawing Sheets

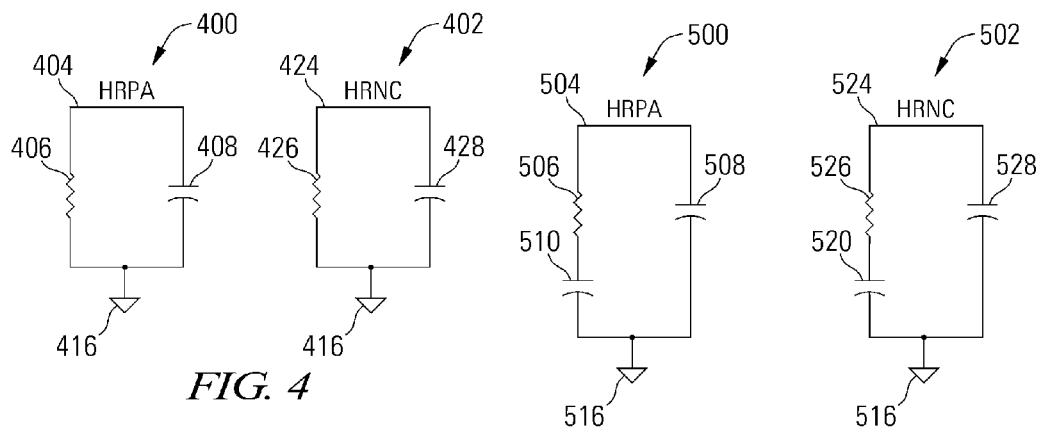
FIG. 4
FIG. 5
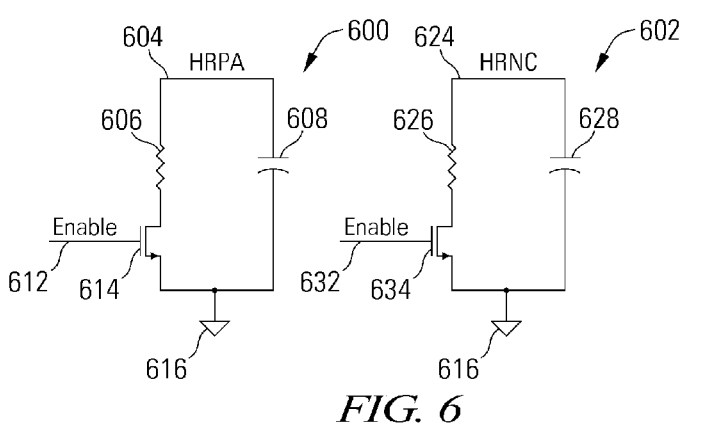
FIG. 6
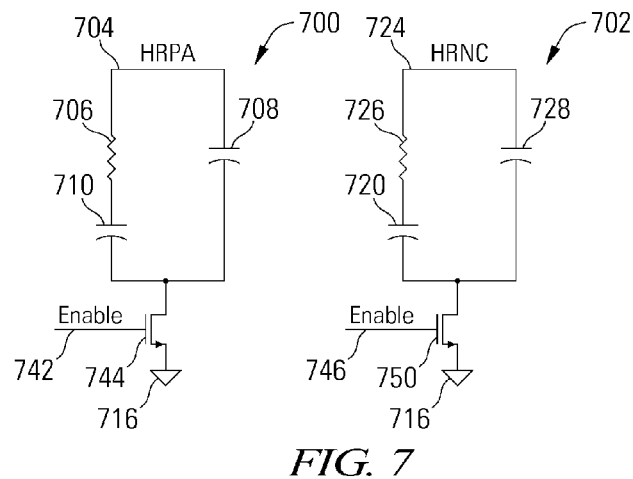
FIG. 7

US 9,431,050 B1

PREAMPLIFIER COMMON-MODE NOISE REJECTION FOR TWO-DIMENSIONAL MAGNETIC RECORDING

FIELD OF THE INVENTION

Various embodiments of the present invention provide for common-mode noise rejection in a two-dimensional magnetic recording storage system with a magnetoresistive array reader with at least one shared pin.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the write coil of the head assembly such that a corresponding magnetic flux pattern is induced in the storage medium. To retrieve the stored data, the head assembly is positioned again over the track as the storage medium is rotated. In this position, the previously stored magnetic flux pattern induces a signal in the read head that can be converted to the previously recorded digital data.

In an effort to increase areal density capability, hard disk drive manufacturers are exploring technology utilizing multiple read sensors, also referred to as two-dimensional magnetic recording. A downside of this technology is that it increases the number of electrical connections which must be established between the preamplifier and the head assembly where the read sensors are located. To mitigate the number of increased connections, sharing of traces between the sensors has been proposed. While this is very effective in reducing the number of electrical connections it also imposes some negative consequences on electrical performance. One such consequence is a reduced capability to reject external common-mode noise due to impedance imbalances on the terminating ends of these connections.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

FIG. 4 depicts single-ended impedance matching networks in accordance with some embodiments of the present invention;

FIG. 5 depicts single-ended impedance matching networks with DC load removal capacitors in accordance with some embodiments of the present invention;

FIG. 6 depicts single-ended impedance matching networks with DC load removal switches in accordance with some embodiments of the present invention;

FIG. 7 depicts single-ended impedance matching networks with DC load removal capacitors and network disable switches in accordance with some embodiments of the present invention;

DETAILED DESCRIPTION OF THE INVENTION

Embodiments of the present invention are related to impedance matching networks to improve common-mode noise rejection in both series-connected and parallel-connected magnetoresistive (MR) sensors with shared pins in an array reader for two-dimensional magnetic recording. Two-dimensional magnetic recording (TDMR) includes the use of an array of sensors in a read head assembly. The array can be used to simultaneously read data from a data track using a number of MR sensors, which can result in increased areal density by accounting for adjacent-track information bordering the principal track. Direct connections between a preamplifier and a read head assembly with N read heads would require 2N terminal pairs, however, this is undesirable as it increases size and degrades flexibility of the flexible circuit or transmission line between the preamplifier and the read head assembly, which is on a movable slider over the storage medium. By sharing at least one pin in the array reader across multiple sensors, the number of traces or connections on the flexible circuit can be reduced. In order to control susceptibility of the system to common-mode noise from external sources, impedance balancing networks are included in the system to increase common-mode rejection.

Figure 1:
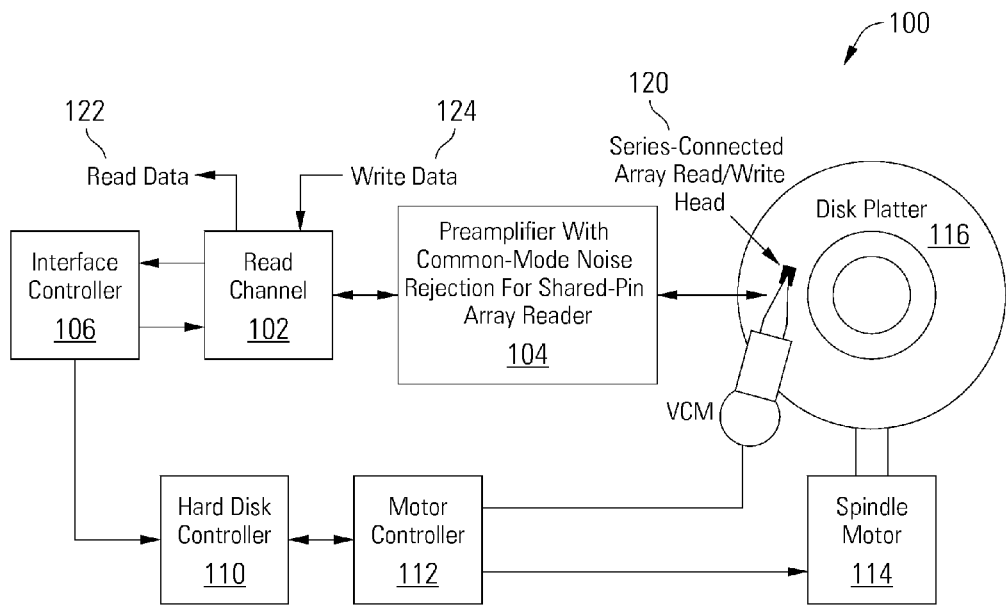
FIG. 1 depicts a two-dimensional magnetic recording storage system including a preamplifier with common-mode noise rejection for a shared-pin array reader in accordance with some embodiments of the present invention.

Turning to FIG. 1, a storage system 100 is illustrated as an example application of a preamplifier with common-mode noise rejection for a shared-pin array reader in a two-dimensional magnetic recording system in accordance with some embodiments of the present invention. The storage system 100 includes a read/write head assembly 120 with an array of read heads or magnetoresistive (MR) sensors which can be connected either in series, or in parallel with one or more shared pins. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, data magnetically recorded on disk platter 116 are sensed by the array of MR sensors in read/write head assembly 120 as disk platter 116 is rotated by spindle motor 114. The resulting readback signals are provided as continuous, minute analog signals representative of the magnetic data on disk platter 116. These minute analog signals are transferred from read/write head assembly 120 to read channel circuit 102 via preamplifier 104. Preamplifier 104 is operable to amplify the minute analog signals accessed from disk platter 116, as well as to bias the MR sensors in read/write head assembly 120. Impedance-balancing networks are included in preamplifier 104 or, in some embodiments, connected to the traces at the inputs to the preamplifier 104 to increase common-mode rejection. Read channel circuit 102 digitizes and decodes the received analog signal to recreate the information originally written to disk platter 116. This data is provided as read data 122 to a receiving circuit. A write operation is substantially the opposite of the preceding read operation with write data 124 being provided from read channel circuit 102.

Figure 2:
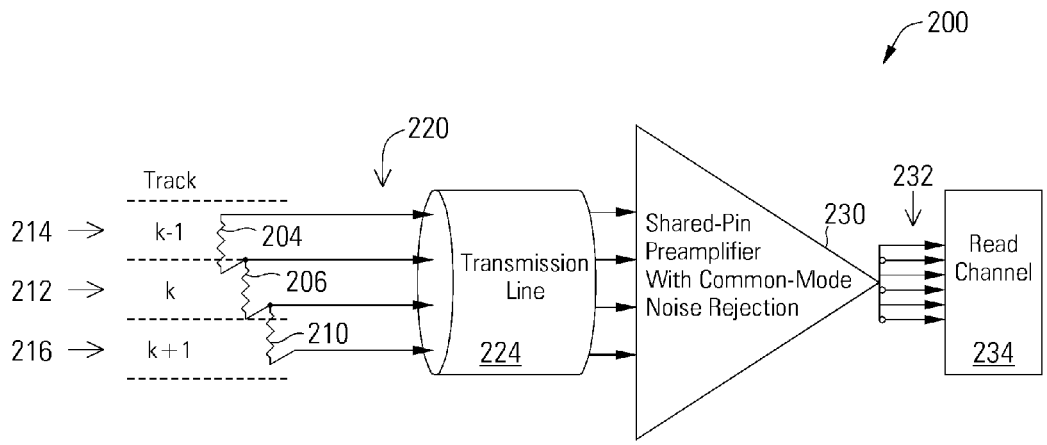
FIG. 2 depicts a head slider with an array of series-connected read heads, a preamplifier and a read channel in accordance with some embodiments of the present invention.

Turning to FIG. 2, a diagram 200 depicts an array of N series-connected MR read heads 204, 206, 210 in accordance with some embodiments of the present invention. In the example depicted in FIG. 2, N=3, although any number of MR read heads can be included. The MR read heads 204, 206, 210 are aligned over a central track k 212 on a rotating storage medium. Read head 206 reads the central track k 212; read heads 204, 206 are disposed to either side of the central head 206, and may also read portions of bordering tracks k−1 214 and k+1 216, respectively.

The MR read heads 204, 206, 210 are depicted schematically as resistors. A flexible transmission line interconnect 224 joins the heads 204, 206, 210 to the preamplifier 230. As the outputs of MR read heads 204, 206, 210 are small, they are amplified by preamplifier 230, for example using low-noise amplification (LNA), prior to transmission to the read channel 234.

The signals from heads 204, 206, 210 are sensed semi-differentially by the low noise amplifier in the preamplifier 230 in some embodiments. The MR read heads 204, 206, 210 are connected to the preamplifier 230 through a flexible circuit or transmission line 224 which in some cases includes N+1 leads 220, although any number of leads can be used.

In operation, the head slider with the MR read heads 204, 206, 210 is positioned over a principal data track 212 on a magnetic disk platter, and as the disk platter is rotated, the magnetic medium induces or modulates the electrical currents through the read heads 204, 206, 210. The resulting readback signals on the N+1 leads 220 are representative of the data written to the data track 212, and to some extent of the data written to neighboring data tracks 214, 216.

A low noise amplifier within a preamplifier 230 provides low-noise amplification of the minute analog signals on the N+1 leads 220. Impedance-balancing networks in the preamplifier 230, or external to the preamplifier 230, increase common-mode rejection in the system, reducing susceptibility to external RF noise sources such as, for example, cellphones. The sharing of at least one lead results in asymmetric single-ended impedance in the N+1 leads 220. The impedance-balancing networks substantially balance the single-ended impedance on the N+1 leads 220 at the inputs to the preamplifier 230, so that interfering signals are not converted to differential signals which affect the amplified output of the preamplifier 230.

The amplified analog signals are provided to a read channel circuit 234, for example using differential connections 232. The read channel circuit 234 can process the signals in any suitable manner. In some embodiments, the read channel circuit 234 includes an analog front end performing further amplification, biasing, and filtering, one or more analog to digital converters generating digital samples based on the analog signals, equalizers that filter the digital samples, one or more data detectors such as, but not limited to, Viterbi algorithm detectors to identify the values in the equalized data samples, and one or more data decoders such as, but not limited to, Reed Solomon decoders or Low Density Parity Check decoders to perform error detection and correction of the data. Adjacent track interference in the readback signals on the N+1 leads 220 is also sampled and mitigated by multi-dimensional signal-processing algorithms in some embodiments of the read channel circuit 234, leading to improved error-rate performance relative to a single-reader configuration.

Figure 3:
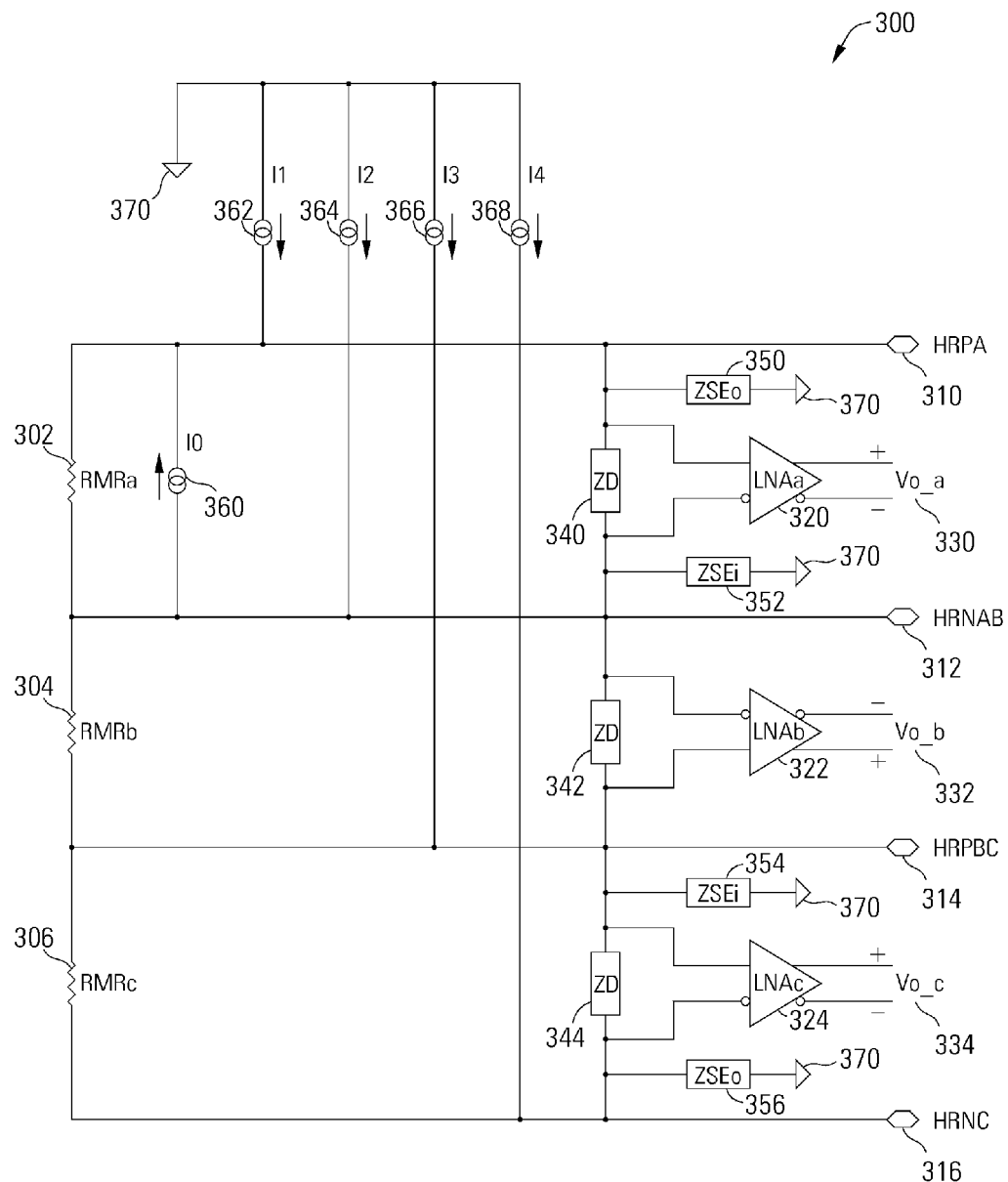
FIG. 3 depicts a series-connected magnetoresistive array reader with impedance matching networks in accordance with some embodiments of the present invention.

Turning to FIG. 3, a system 300 with a series-connected magnetoresistive array reader is depicted with three magnetoresistive (MR) heads RMRa 302, RMRb 304, RMRc 306 in accordance with some embodiments of the present invention. Although the array reader 302, 304, 306 is shown with a three-element series-connected N+1 magnetoresistive sensor configuration, embodiments of the present invention are not limited to any particular number of magnetoresistive sensors and can also serve N+1 lead parallel head connections in which all heads share a common terminal. Based upon the disclosure provided herein, one of ordinary skill in the art will recognize a variety of array reader and connection configurations that could be used.

A differential low-noise amplifier (LNA) LNAa 320, LNAb 322, LNAc 324 is associated with each of the three heads RMRa 302, RMRb 304, RMRc 306. In some embodiments, the low-noise amplifiers LNAa 320, LNAb 322, LNAc 324 comprise shunt-feedback amplifiers and are embodied in the preamplifier, although other types and locations of low-noise amplifiers can be used in other embodiments.

The low-noise amplifiers LNAa 320, LNAb 322, LNAc 324 yield differential signal outputs Vo_a 330, Vo_b 332, Vo_c 334 that are provided to subsequent data processing stages, such as to an analog front end in a read channel circuit, including for example a variable gain amplifier, analog to digital converter, detector and decoder, etc.

Independent bias current sources (not shown) of any type can be connected to the pins or terminals HRPA 310, HRNAB 312, HRPBC 314, and HRNC 316 for the array to bias the three heads RMRa 302, RMRb 304, RMRc 306 in the series string. As the heads RMRa 302, RMRb 304, RMRc 306 are passed through magnetic fields resulting from the data stored on a magnetic storage medium, the bias currents through the heads RMRa 302, RMRb 304, RMRc 306 are modulated and the low-noise amplifiers LNAa 320, LNAb 322, LNAc 324 amplify the resulting voltage levels.

Notably, the outer terminals HRPA 310 and HRNC 316 in the series-connected three-head array of FIG. 3 are dedicated to heads RMRa 302 and RMRc 306, respectively, while inner terminal HRNAB 312 is shared by heads RMRa 302 and RMRb 304 and inner terminal HRPBC 314 is shared by heads RMRb 304 and RMRc 306. While terminals HRPA 310 and HRPBC 314 are configured as positive terminals and terminals HRNAB 312 and HRNC 316 are configured as negative terminals in the array reader of FIG. 3, this is merely an example configuration and the preamplifier common-mode noise rejection is not limited to use with any particular type or configuration of array reader or terminal polarity.

Common-mode rejection is an important figure of merit for differential wideband low noise amplifiers as it describes the amplifier's ability to reject common-mode interference which could potentially overwhelm the input data signal. An example of a signal which can cause common-mode interference is a carrier signal used in wireless communication. The common-mode rejection ratio (CMRR) is qualitatively defined as the ratio of output signal observed when a purely differential input signal is applied, to output signal observed when a purely common-mode input signal is applied. More formally, referring to data path A of FIG. 3 from head RMRa 302:

$$CMRR(f) = 20\log_{10}\left(\frac{V_{o\_a}(f)|_{id=1,ic=0}}{V_{o\_a}(f)|_{id=0,ic=1}}\right) \quad \text{(Eq 1)}$$

where id is a differential current across the input terminals of a low-noise amplifier (e.g., LNAa 320), ic is a common-mode current, and Vo_a is the output of a low-noise amplifier (e.g., LNAa 320). If an amplifier perfectly rejects common-mode signals then its CMRR=∞.

For fully differential independent pin preamplifiers for array readers without shared pins, differential and common-mode stimuli can be applied using voltage sources with a series resistance to characterize impedance. Source resistances of RMR and RMR/2 are used for the differential and common-mode sources, respectively, where RMR is the resistance of each read sensor. However, for array readers with one or more shared pins, the impedance at each pin is generally not balanced. Therefore, the CMRR measurement is made independent of RMR by using current sources (e.g., I0 360, I1 362, I2 364, I3 366, and I4 368) and thus, accurately determines any mode conversion introduced by the preamplifier.

For the array reader depicted in FIG. 3, external stimulus or interference sources are modeled by current sources I0 360, I1 362, I2 364, I3 366, and I4 368. Current source I0 360, connected across head RMRa 302, models a differential stimulus id, injecting current into the positive or non-inverting terminal of LNAa 320 and pulling current out of the negative or inverting terminal of LNAa 320. Such a stimulus modeling source I0 360 tests the differential input impedance ZD 340 of LNAa 320. Current sources I1 362, I2 364, I3 366, and I4 368, connected between an AC ground 370 and each of the terminals HRPA 310, HRNAB 312, HRPBC 314, and HRNC 316, respectively, are common-mode stimulus sources that model external interference, injecting a symmetric current in into each of the terminals HRPA 310, HRNAB 312, HRPBC 314, and HRNC 316.

FIG. 3 also depicts the single-ended impedance ZSEo 350, ZSEi 352, ZSEi 354, ZSEo 356 on the four input terminals HRPA 310, HRNAB 312, HRPBC 314, and HRNC 316. Both inner terminals HRNAB 312, HRPBC 314 have impedances of ZSEi 352, ZSEi 354 to ground 370. Because of this, data path B from read head RMRb 304 typically has good CMRR. However, because ZSEi 352, 354≠ZSEo 350, 356, the outer data paths (A and C) from read heads RMRa 302, RMRc 306 experience a greater degree of common-mode to differential-mode conversion and their CMRR degrades. If the single ended impedances ZSEo 350, ZSEo 356 of outer terminals HRPA 310 and HRNC 316 are not balanced with the single ended impedances ZSEi 352, ZSEi 354 of inner terminals HRNAB 312, HRPBC 314, a differential voltage will develop across the input terminals of LNAa 320 and LNAc 324. These differential voltages will be amplified by the LNAa 320 and LNAc 324 and can overwhelm the actual signals being read from the storage device, making it difficult or impossible to recover the original data in the presence of the interference.

To address the CMRR problem on the outer data paths, the single-ended impedances ZSEo 350, ZSEo 356 of outer terminals HRPA 310 and HRNC 316 are modified to make ZSEo 350, 356≈ZSEi 352, 354. An equivalent alternative implementation is to modify the impedance on the inner pins to accomplish the same CMRR improvement. If the single-ended impedance on both input terminals of the LNA is symmetric then CMRR performance will be improved. Thus, impedance balancing networks such as, but not limited to, those depicted in FIGS. 4-6 are connected to appropriate terminals of the array reader to balance or substantially balance the single ended impedance of the terminals HRPA 310, HRNAB 312, HRPBC 314, and HRNC 316. For example, in the series-connected array reader of FIG. 3, impedance balancing networks are connected to the outer terminals HRPA 310 and HRNC 316 so that the overall single ended impedances ZSEo 350, ZSEo 356 of outer terminals HRPA 310 and HRNC 316 are balanced with the single ended impedances ZSEi 352, ZSEi 354 of the inner terminals HRNAB 312, HRPBC 314. Notably, some of the impedances depicted in FIG. 3 are impedances inherent in the system, such as the differential input impedances ZD 340, ZD 342, ZD 344 and the single ended impedances ZSEi 352, ZSEi 354 of inner terminals HRNAB 312, HRPBC 314, while others of the impedances depicted in FIG. 3 are combinations of impedances inherent in the system and the impedances of the added impedance balancing networks, such as single ended impedances ZSEo 350, ZSEo 356 of outer terminals HRPA 310 and HRNC 316.

Turning to FIG. 4, impedance balancing networks 400, 402 are depicted connected between the outer terminals HRPA 404 and HRNC 424 of an array reader and ground 416 in accordance with some embodiments of the invention. In some embodiments, the impedance balancing networks 400, 402 each include a resistor (or array of resistive elements) 406, 426, respectively, connected in parallel with a capacitor (or array of capacitive elements) 408, 428, respectively. The impedance balancing networks 400, 402 can each have the same impedances or different impedances as needed to balance the single-ended impedances to make ZSEo≈ZSEi. The resistors 406, 426 implement the impedance matching at low frequencies and the capacitors 408, 428 implement the impedance matching at high frequencies. The specific resistance and capacitance values used to balance the single-ended impedances to make ZSEo≈ZSEi are dependent on the system design, and one of ordinary skill in the art will recognize a variety of techniques for selecting these values given the system design and the measured or simulated values of ZSEi and of ZSEo prior to impedance balancing. Again, as indicated above, in some other embodiments impedance matching networks are added to the inner terminals rather than the outer terminals to balance the single-ended impedances to make ZSEo≈ZSEi.

Turning to FIG. 5, impedance balancing networks 500, 502 are depicted connected between the outer terminals HRPA 504 and HRNC 524 of an array reader and ground 516 in accordance with some embodiments of the invention. The impedance balancing networks 500, 502 each include a capacitor 508, 528 for high frequency impedance matching, connected between terminals HRPA 504 and HRNC 524, respectively, and ground 516. The impedance balancing networks 500, 502 each also include a resistor 506, 526 in series with a capacitor 510, 520 for low frequency impedance matching, connected between terminals HRPA 504 and HRNC 524, respectively, and ground 516. The series-connected capacitors 510, 520 operate to remove the direct current (DC) load on the input pins of low-noise amplifiers connected to terminals HRPA 504 and HRNC 524, which the resistors 506, 526 would otherwise present. Although the resistors 506, 526 are depicted connected to HRPA 504 and HRNC 524 and the capacitors 510, 520 are depicted connected to ground 516, the position of the resistors 506, 526 and capacitors 510, 520 can be swapped.

Turning to FIG. 6, impedance balancing networks 600, 602 are depicted connected between the outer terminals HRPA 604 and HRNC 624 of an array reader and ground 616 in accordance with some embodiments of the invention. The impedance balancing networks 600, 602 each include a capacitor 608, 628 for high frequency impedance matching, connected between terminals HRPA 604 and HRNC 624, respectively, and ground 616. The impedance balancing networks 600, 602 each also include a resistor 606, 626 in series with a switch 614, 634 for low frequency impedance matching, connected between terminals HRPA 604 and HRNC 624, respectively, and ground 616. The switches 614, 634 can be opened to remove the direct current (DC) load on the input pins of low-noise amplifiers connected to terminals HRPA 604 and HRNC 624, which the resistors 606, 626 would otherwise present. Although the resistors 606, 626 are depicted connected to HRPA 604 and HRNC 624 and the switches 614, 634 are depicted connected to ground 616, the position of the resistors 606, 626 and switches 614, 634 can be swapped. The switches 614, 634 can be implemented in any suitable manner, such as, but not limited to, using a metal oxide semiconductor (MOS) or any other type of transistor, etc. The switches 614, 634 are controlled by enable signals 612, 632, which can be asserted using any suitable control circuit or device. For example, a user programmable register is provided in some embodiments allowing a user to program the register to open the switches 614, 634 when removing a DC load on the low-noise amplifier input pins is more important than improving common-mode noise rejection by impedance matching. In some other embodiments, the switches 614, 634 are automatically opened when the system is operated in a mode in which a DC load to ground would be a problem. Based upon the disclosure provided herein, one of ordinary skill in the art will recognize a variety of control schemes that may be used to generate enable signals 612, 632 to control switches 614, 634 in relation to different embodiments of the present invention.

Turning to FIG. 7, impedance balancing networks 700, 702 are depicted connected between the outer terminals HRPA 704 and HRNC 724 of an array reader and ground 716 in accordance with some embodiments of the invention. The impedance balancing networks 700, 702 each include a capacitor 708, 728 for high frequency impedance matching, connected between terminals HRPA 704 and HRNC 724, respectively, and ground 716. The impedance balancing networks 700, 702 each also include a resistor 706, 726 in series with a capacitor 710, 720 for low frequency impedance matching, connected between terminals HRPA 704 and HRNC 724, respectively, and ground 716. The series-connected capacitors 710, 720 operate to remove the direct current (DC) load on the input pins of low-noise amplifiers connected to terminals HRPA 704 and HRNC 724, which the resistors 706, 726 would otherwise present. Although the resistors 706, 726 are depicted connected to HRPA 704 and HRNC 724 and the capacitors 710, 720 are depicted connected to ground 716, the position of the resistors 706, 726 and capacitors 710, 720 can be swapped.

The impedance balancing networks 700, 702 each also include a switch 744, 750 connected in series so that the entire networks 700, 702 can be disabled. Switches 744, 750 can be connected between the impedance balancing networks 700, 702 and ground 716 as depicted in FIG. 7, or can be connected above the impedance balancing networks 700, 702 between the input terminals HRPA 704 and HRNC 724 and both paths of the networks. The switches 744, 750 can be opened to disconnect the impedance balancing networks 700, 702 from the system. The switches 744, 750 can be implemented in any suitable manner, such as, but not limited to, using a metal oxide semiconductor (MOS) or any other type of transistor, etc. The switches 744, 750 are controlled by enable signals 742, 746, which can be asserted using any suitable control circuit or device. For example, a user programmable register is provided in some embodiments allowing a user to program the register to open the switches 744, 750 when impedance balancing networks would negatively impact other performance characteristics of the system. Based upon the disclosure provided herein, one of ordinary skill in the art will recognize a variety of control schemes that may be used to generate enable signals 742, 746 to control switches 744, 750 in relation to different embodiments of the present invention.

Figure 8:
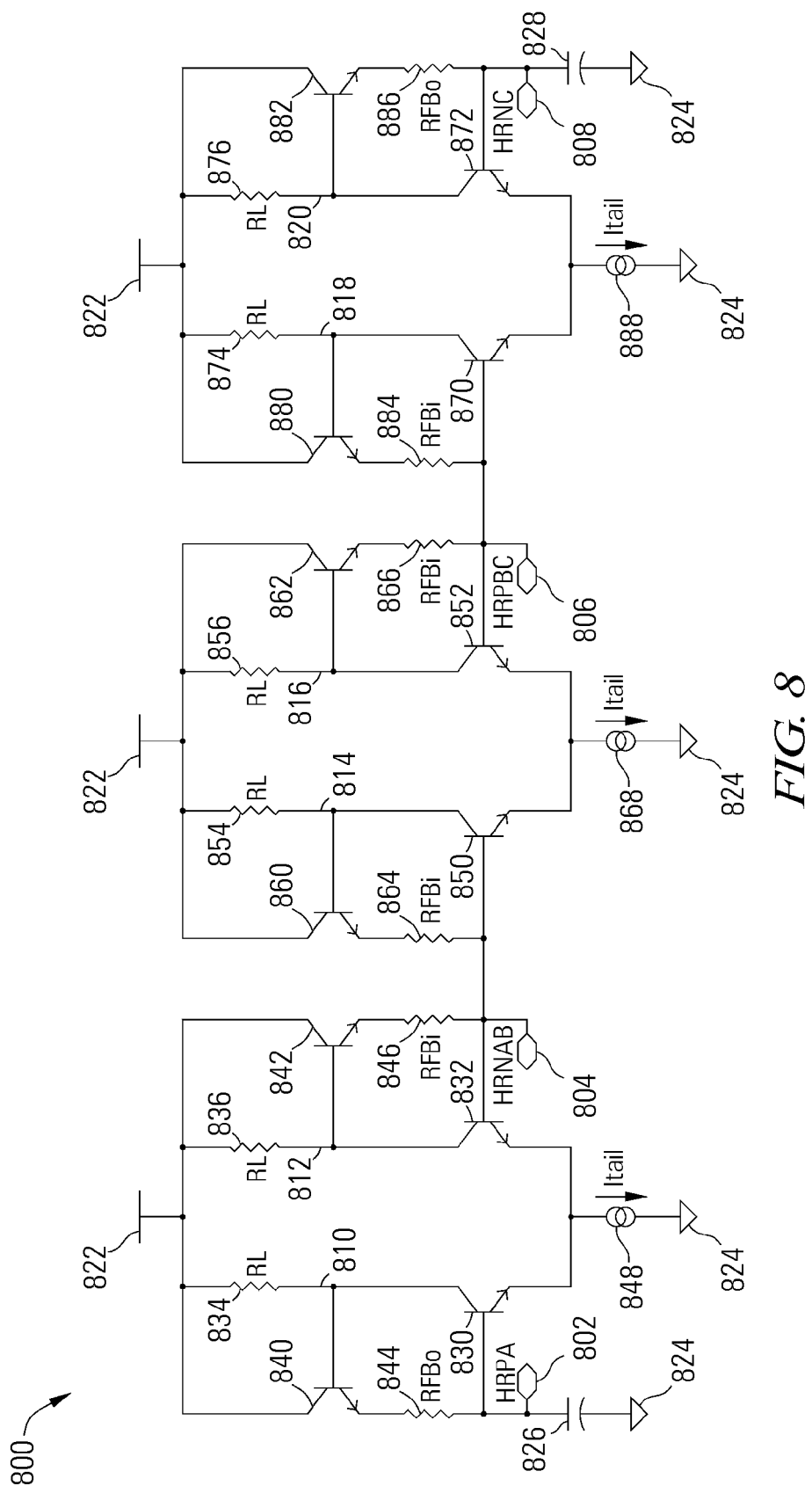
FIG. 8 depict preamplifier low-noise amplifiers for a two-dimensional magnetic recording system with single-ended impedance matching partially incorporated in feedback resistors in accordance with some embodiments of the present invention.

Turning to FIG. 8, preamplifier low-noise amplifiers 800 for a two-dimensional magnetic recording system are depicted with single-ended impedance matching partially incorporated in feedback resistors in accordance with some embodiments of the present invention. Each of the three low-noise amplifiers comprises a differential shunt-feedback amplifier. In some embodiments, the amplifiers 800 are used to implement LNAa 320, LNAb 322 and LNAc 324 of FIG. 3.

A first of the low-noise amplifiers includes a differential pair of input transistors 830, 832 connected in parallel, with the gates connected to input pins HRPA 802, HRNAB 804, respectively. A tail current source 848 is connected between the common sources of the input transistors 830, 832 and ground 824. The drains of the differential pair of input transistors 830, 832 are connected to load resistors 834, 836. In some embodiments, bipolar junction cascode transistors (not shown) having common bases can be included between the drains of the differential pair of input transistors 830, 832 and the load resistors 834, 836.

The differential output nodes 810, 812 between the input transistors 830, 832 and the load resistors 834, 836 are connected to the bases of shunt feedback transistors 840, 842. The emitter-follower shunt feedback transistors 840, 842 are connected in series with feedback resistors RFBo 844, RFBi 846 between the power rail 822 and the input pins HRPA 802, HRNAB 804. In embodiments in which the impedance balancing networks are connected to outer pins of the array reader, i.e., to input pins HRPA 802 and HRNC 808, the resistive portion of the impedance balancing network can be implemented by included it in the feedback resistor RFBo 844 for the outer pin HRPA 802. The capacitive portion of the impedance balancing network is implemented by capacitor 826 between outer pin HRPA 802 and ground 824.

A second of the low-noise amplifiers includes a differential pair of input transistors 850, 852 connected in parallel, with the gates connected to shared input pins HRNAB 804, HRPBC 806, respectively. A tail current source 868 is connected between the common sources of the input transistors 850, 852 and ground 824. The drains of the differential pair of input transistors 850, 852 are connected to load resistors 854, 856. In some embodiments, bipolar junction cascode transistors (not shown) having common bases can be included between the drains of the differential pair of input transistors 850, 852 and the load resistors 854, 856.

The differential output nodes 814, 816 between the input transistors 850, 852 and the load resistors 854, 856 are connected to the bases of shunt feedback transistors 860, 862. The emitter-follower shunt feedback transistors 860, 862 are connected in series with feedback resistors RFBi 864, RFBi 866 between the power rail 822 and the shared input pins HRNAB 804, HRPBC 806. Because both input pins HRNAB 804, HRPBC 806 are shared, in some embodiments in which the impedance balancing network is connected to dedicated, outer pins of the array reader, the feedback resistors RFBi 864, RFBi 866 are not altered by the implementation of the impedance balancing network. In other embodiments in which the impedance balancing network is connected to inner pins, feedback resistors RFBi 864, RFBi 866 are adapted to implement the resistive portion of the impedance balancing network.

A third of the low-noise amplifiers includes a differential pair of input transistors 880, 882 connected in parallel, with the gates connected to input pins HRPBC 806, HRNC 808, respectively. A tail current source 888 is connected between the common sources of the input transistors 880, 882 and ground 824. The drains of the differential pair of input transistors 880, 882 are connected to load resistors 874, 876. In some embodiments, bipolar junction cascode transistors (not shown) having common bases can be included between the drains of the differential pair of input transistors 880, 882 and the load resistors 874, 876.

The differential output nodes 818, 820 between the input transistors 880, 882 and the load resistors 874, 876 are connected to the bases of shunt feedback transistors 880, 882. The emitter-follower shunt feedback transistors 880, 882 are connected in series with feedback resistors RFBi 884, RFB0 886 between the power rail 822 and the input pins HRPBC 806, HRNC 808. In embodiments in which the impedance balancing networks are connected to outer pins of the array reader, i.e., to input pins HRPA 802 and HRNC 808, the resistive portion of the impedance balancing network can be implemented by included it in the feedback resistor RFBo 886 for the outer pin HRNC 808. The capacitive portion of the impedance balancing network is implemented by capacitor 828 between outer pin HRNC 808 and ground 824.

Thus, in embodiments in which the data path low noise amplifiers are implemented with shunt feedback differential amplifiers, the resistive portion of the impedance balancing networks can be implemented by skewing the feedback resistors RFBo 844, RFBo 886 such that RFBi≈2*RFBo to accomplish impedance balancing at low frequency. Capacitors 826, 828 are added to pins HRPA 802 and HRNC 808 to accomplish impedance balancing at high frequency.

Figure 9:
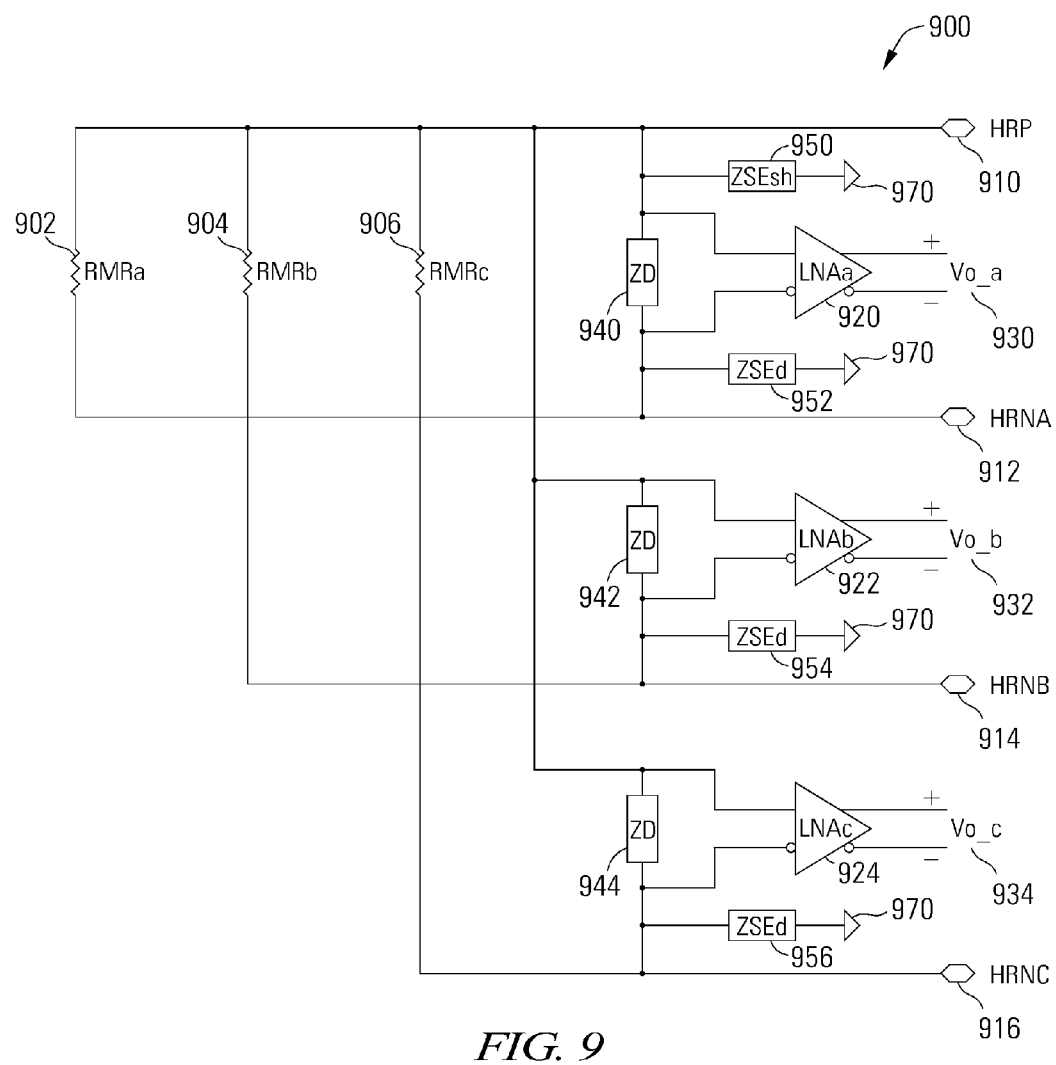
FIG. 9 depicts a parallel-connected magnetoresistive array reader with impedance matching networks in accordance with some embodiments of the present invention.

The impedance balancing concepts applied to the series-connected array reader of FIG. 3 can also be applied to a parallel-connected shared-pin array reader as depicted in FIG. 9. Turning now to FIG. 9, a system 900 with a parallel-connected magnetoresistive array reader with a shared pin HRP 910 is depicted in accordance with some embodiments of the present invention. In this embodiment, each MR head RMRa 902, RMRb 904, RMRc 906 is connected between the common or shared pin or terminal 910 and their respective dedicated pins HRNA 912, HRNB 914, HRNC 916.

Although the array reader 900 is shown with a three-element (902, 904, 906) parallel shared-pin N+1 magnetoresistive sensor configuration, embodiments of the present invention are not limited to any particular number of magnetoresistive sensors.

A differential low-noise amplifier 920, 922, 924 is associated with each of the three heads 902, 904, 906. One input (e.g., the non-inverting input) of each differential low-noise amplifiers 920, 922, 924 is connected to the shared terminal HRP 910, with the other input (e.g., the inverting inputs) of each differential low-noise amplifier 920, 922, 924 being connected to one of the dedicated pins 912, 914, 916, respectively.

The low-noise amplifiers 920, 922, 924 yield differential signal outputs Vo_a 930, Vo_b 932, Vo_c 934 in some embodiments that are provided to subsequent data processing stages, such as to an analog front end in a read channel circuit, including for example a variable gain amplifier, analog to digital converter, detector and decoder, etc.

To increase the common-mode noise rejection of the parallel-connected array reader and preamplifier 900, the impedance imbalance between the shared pin HRP 910 and each of the dedicated pins HRNA 912, HRNB 914, HRNC 916 is corrected by impedance balancing networks connected to the dedicated pins HRNA 912, HRNB 914, HRNC 916.

As in FIG. 3, the inherent differential impedances ZD 940, ZD 942, ZD 944, the inherent single-ended impedance ZSEsh 950 at the shared pin HRP 910, and the combination of inherent and balancing network single-ended impedances ZSEd 952, ZSEd 954, ZSEd 956 at the dedicated pins HRNA 912, HRNB 914, HRNC 916 are depicted at the inputs to the low-noise amplifiers 920, 922, 924. In some embodiments, impedance balancing networks such as, but not limited to, those depicted in FIGS. 4-6 are added to the dedicated pins HRNA 912, HRNB 914, HRNC 916, altering the single-ended impedances ZSEd 952, ZSEd 954, ZSEd 956 so they are about the same as the single-ended impedance ZSEsh 950 at the shared pin HRP 910. In some other embodiments, the impedance imbalance between the shared pin HRP 910 and each of the dedicated pins HRNA 912, HRNB 914, HRNC 916 is corrected by an impedance balancing network connected to the shared pin HRP 910.

Figure 10:
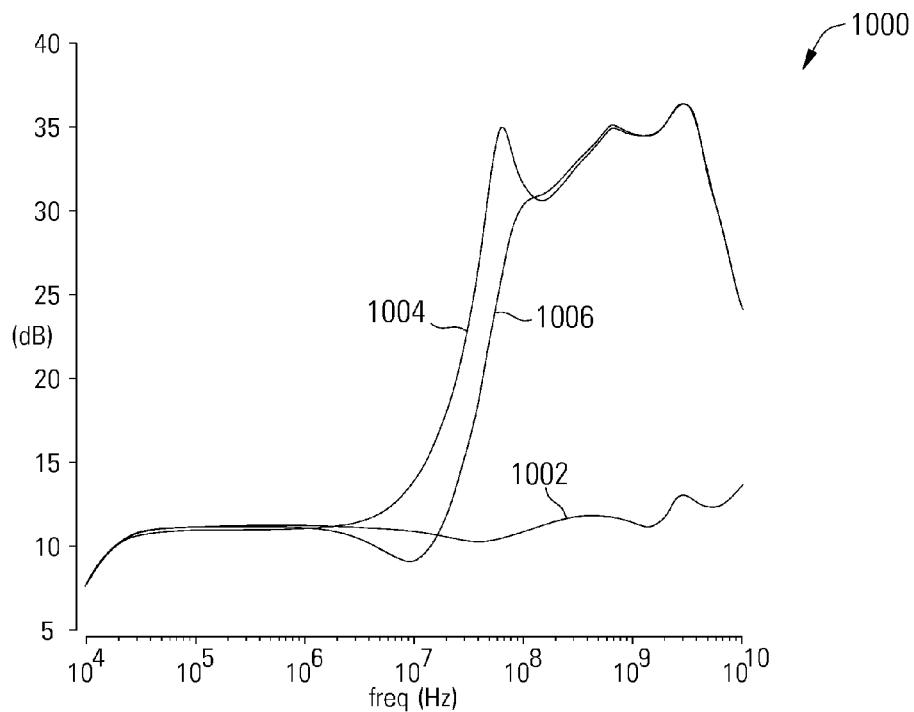
FIG. 10 depicts a plot of common-mode rejection ratio for a two-dimensional magnetic recording system with and without single-ended impedance matching networks.

Turning to FIG. 10, a plot 1000 depicts the common-mode rejection ratio (CMRR) for data path A from read sensor RMRa 302 in the two-dimensional magnetic recording system of FIG. 3, with and without single-ended impedance matching networks. A higher common-mode rejection ratio is better, indicating that the system is better at rejecting common-mode interference signals. Curve 1002 depicts the baseline common-mode rejection ratio of data path A in the presence of an interference stimulus without the single-ended impedance matching networks disclosed herein. Curve 1004 depicts the common-mode rejection ratio of data path A in the presence of an interference stimulus with the single-ended impedance matching networks 400, 402 of FIG. 4 connected to outer terminals of the array reader. In this embodiment, the single-ended impedance matching RC networks 400, 402 provide significant improvement above 100 MHz. A rejection improvement of 23 dB (~14×) is achieved at 2.4 GHz. Similar results, shown in curve 1006, are obtained using the single-ended impedance matching networks 500, 502, 600, 602 of FIGS. 5 and 6, which also address DC loading concerns in the system using DC blocking capacitors 510, 520 or switches 614, 634.

Figure 11:
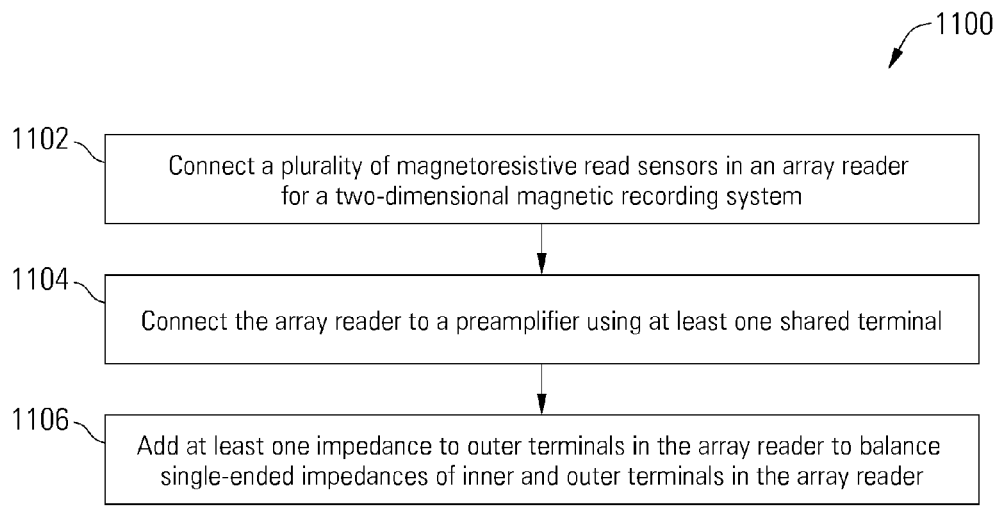
FIG. 11 is a flow diagram of an operation to provide common-mode noise rejection by balancing single-ended impedances of inner and outer terminals in an array reader for a two-dimensional magnetic recording system in accordance with some embodiments of the present invention.

Turning to FIG. 11, a flow diagram 1100 is depicted of an operation to provide common-mode noise rejection by balancing single-ended impedances of inner and outer terminals in an array reader for a two-dimensional magnetic recording system in accordance with some embodiments of the present invention. Following flow diagram 1100, a number of magnetoresistive read sensors are connected either in series or parallel in an array reader for two-dimensional magnetic recording. (Block 1102) The array reader is connected to a preamplifier using at least one shared terminal. (Block 1104) At least one impedance balancing network is added to outer terminals in the array reader to balance single-ended impedances of inner and outer terminals in the array reader. (Block 1106) In parallel-connected array reader embodiments, the "outer" terminal comprises the dedicated terminals for each read sensor, and the "inner" terminal comprises the shared or common terminal connected to each read sensor. In operation, the sensors in the impedance-balanced array reader are biased and passed over a data track on a storage medium, and the resulting analog signal from each of the plurality of magnetoresistive read sensors is amplified in a preamplifier using low-noise amplifiers.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 can be modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory can be used as a cache where it offers faster access time than that offered by disk platter 116. In such a case, the solid state memory can be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

In conclusion, embodiments of the present invention provide novel systems, devices, methods and arrangements for preamplifier common-mode noise rejection for two-dimensional magnetic recording, applicable to series-connected and parallel-connected array readers or array readers of any other topology having impedance imbalances due to shared pins. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for two-dimensional magnetic recording, comprising:
   an array reader comprising a plurality of magnetoresistive read sensors configured to read data from a storage medium, the plurality of magnetoresistive read sensors comprising a plurality of connection terminals, wherein at least one of the connection terminals is shared by more than one of the plurality of magnetoresistive read sensors;
   a plurality of low-noise amplifiers connected to the plurality of connection terminals, each of the plurality of low-noise amplifiers configured to amplify a differential signal from a different one of the plurality of magnetoresistive read sensors; and
   a plurality of impedance networks connected to a subset of the plurality of connection terminals.

2. The apparatus of claim 1, wherein the plurality of magnetoresistive read sensors are connected in a series string, and wherein two of the plurality of connection terminals comprise outer terminals at opposite ends of the series string, and wherein a remainder of the plurality of connection terminals comprise inner terminals between pairs of the plurality of magnetoresistive read sensors.

3. The apparatus of claim 2, wherein the plurality of impedance networks are connected to the outer terminals.

4. The apparatus of claim 3, wherein the plurality of impedance networks are configured to balance single ended impedance at the outer terminals with single ended impedance at the inner terminals.

5. The apparatus of claim 1, wherein the plurality of magnetoresistive read sensors are connected in parallel, and wherein one of the plurality of connection terminals comprises a shared terminal connected to each of the plurality of magnetoresistive read sensors and a remainder of the plurality of connection terminals comprise dedicated terminals, each connected to a different one of the plurality of magnetoresistive read sensors.

6. The apparatus of claim 5, wherein the plurality of impedance networks are connected to the dedicated terminals.

7. The apparatus of claim 6, wherein the plurality of impedance networks are configured to balance single ended impedance at the dedicated terminals with single ended impedance at the shared terminal.

8. The apparatus of claim 1, wherein the plurality of low-noise amplifiers comprise shunt feedback low-noise amplifiers, and wherein at least a portion of the plurality of impedance networks comprise an adjustment to resistance of feedback resistors in the shunt feedback low-noise amplifiers.

9. The apparatus of claim 8, wherein at least a portion of the plurality of impedance networks comprise capacitors connected between outer terminals of the array reader and ground.

10. The apparatus of claim 1, wherein at least some of the plurality of impedance networks comprise parallel resistor capacitor networks.

11. The apparatus of claim 1, wherein at least some of the plurality of impedance networks comprise a resistor and a first capacitor connected in series, and a second capacitor connected in parallel to the resistor and the first capacitor.

12. The apparatus of claim 1, wherein at least some of the plurality of impedance networks comprise a resistor and a switch connected in series, and a capacitor connected in parallel to the resistor and the switch.

13. The apparatus of claim 1, wherein the plurality of impedance networks are connected between the subset of the plurality of connection terminals and an AC ground.

14. A method for accessing a magnetic storage device, comprising:

loading a subset of a plurality of magnetoresistive read sensors in a shared-pin array reader for a two-dimensional magnetic recording system with impedance networks to reduce differences in single ended impedance between terminals in the array reader;

biasing the plurality of magnetoresistive read sensors;

passing the plurality of magnetoresistive read sensors over a data track on a storage medium; and amplifying an analog signal from each of the plurality of magnetoresistive read sensors.

15. The method of claim 14, further comprising connecting the plurality of magnetoresistive read sensors in a series string to form the array reader, wherein the impedance networks are connected to outer terminals of the series string.

16. The method of claim 14, further comprising connecting the plurality of magnetoresistive read sensors in parallel, each of the plurality of magnetoresistive read sensors being connected between a shared common terminal and a dedicated terminal for each of the plurality of magnetoresistive read sensors, wherein the impedance networks are connected to the dedicated terminals.

17. The method of claim 14, further comprising selectably disconnecting the impedance networks from the array reader.

18. The method of claim 14, wherein the impedance networks each comprise a resistor for low frequency impedance matching connected in parallel with a capacitor for high frequency impedance matching.

19. The method of claim 18, further comprising disabling the resistor in the impedance networks to remove a DC load.

20. A storage system comprising:

a storage medium;

a two-dimensional magnetic recording head assembly disposed in relation to the storage medium and comprising a plurality of magnetoresistive read heads sharing a common lead;

impedance balancing network means for balancing single-ended impedance at each terminal in the two-dimensional magnetic recording head assembly, wherein at least some of the plurality of magnetoresistive read heads are balanced with impedance balancing network means with different impedances; and means for amplifying signals from each of the plurality of magnetoresistive read heads.

* * * * *